(12) United States Patent  
Shin et al.

(10) Patent No.: US 9,200,920 B2
(45) Date of Patent: Dec. 1, 2015

(54) MOBILE TERMINAL AND CONTROLLING METHOD THEREOF

(71) Applicant: LG ELECTRONICS INC., Seoul (KR)

(72) Inventors: Jungeun Shin, Seoul (KR); Shinjun Park, Seoul (KR); Sungchae Na, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 13/846,523

(22) Filed: Mar. 18, 2013

(65) Prior Publication Data

US 2014/0141810 A1 May 22, 2014

(30) Foreign Application Priority Data

Nov. 19, 2012 (KR) .......................... 10-2012-0130902

(51) Int. Cl.
- *H04W 24/00* (2009.01)
- *G01C 21/36* (2006.01)
- *H04W 4/02* (2009.01)
- *G01C 21/34* (2006.01)

(52) U.S. Cl.
CPC ........ *G01C 21/3644* (2013.01); *G01C 21/3476* (2013.01); *G01C 21/3611* (2013.01); *H04W 4/02* (2013.01)

(58) Field of Classification Search
CPC ......... H04W 4/02; H04M 1/725; H04L 67/18
USPC ................ 455/456.1, 456.3, 456.6, 457, 566
See application file for complete search history.

(56) References Cited

U.S. PATENT DOCUMENTS

| | | | |
|---|---|---|---|
| 7,515,917 B2* | 4/2009 | Casey | 455/456.1 |
| 2002/0086680 A1* | 7/2002 | Hunzinger | 455/456 |
| 2009/0111487 A1* | 4/2009 | Scheibe | 455/456.6 |
| 2010/0035596 A1* | 2/2010 | Nachman et al. | 455/418 |
| 2010/0289659 A1* | 11/2010 | Verbil | 340/670 |
| 2013/0143586 A1* | 6/2013 | Williams et al. | 455/456.1 |
| 2014/0066106 A1* | 3/2014 | Ngo et al. | 455/457 |

\* cited by examiner

*Primary Examiner* — William Nealon

(74) *Attorney, Agent, or Firm* — Lee, Hong, Degerman, Kang & Waimey

(57) ABSTRACT

A mobile terminal includes an output unit outputting information and a controller. The mobile terminal receives information about a current location of the mobile terminal; generates a keyword list including at least a first keyword item associated with at least a first place or a first time; determines whether a distance between the first place and the current location is within a threshold distance or whether a time gap between the first time and present time is within a threshold time gap; outputs alerting information when the distance is determined to be within the threshold distance or when the time gap is determined to be within the threshold time gap; and outputs route guidance from the current location to a first guide point in response to user input received after the alerting information is output, the user input confirming designation of the first place as the first guide point.

19 Claims, 14 Drawing Sheets

(a)

(b)

(c)

(d)

(a)

(b)

(c)

(d)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0130902, filed on Nov. 19, 2012, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for collecting a keyword in the course of using the mobile terminal and then providing route information related to the keyword efficiently using the collected keyword.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, a mobile terminal tends to provide a navigation function. To this end, the demands for a method and apparatus for guiding a route by facilitating a destination to be set in consideration of user's necessity and environment in providing the navigation function are rising.

SUMMARY

Accordingly, the present invention is directed to a mobile terminal and controlling method thereof that substantially obviate one or more problems due to limitations and disadvantages of the related art.

An exemplary embodiment of the present invention provides a mobile terminal and controlling method thereof, by which a more convenient navigation function can be provided.

Another exemplary embodiment of the present invention provides a mobile terminal and controlling method thereof, by which a destination candidate of navigation can be automatically extracted in response to a schedule in the course of having the mobile terminal used by a user.

Technical tasks obtainable from exemplary embodiments of the present invention disclosed herein are non-limiting. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an exemplary embodiment of the present invention includes a position location module and a controller generating a keyword list including at least one keyword item related to a place, the controller obtaining an information on a current location via the position location module, the controller determining a first guide point corresponding to a first keyword item among keyword items included in the keyword list in consideration of at least one selected from the group consisting of a place information configuring each keyword item included in the keyword list, a time information configuring the each keyword item included in the keyword list, an information on the obtained current location and a current time, and the controller providing a route guidance of a route from the obtained current location to the first guide point.

In another exemplary embodiment of the present invention, a method of controlling a mobile terminal includes generating a keyword list including at least one keyword item related to a place, obtaining an information on a current location, determining a first guide point corresponding to a first keyword item among keyword items included in the keyword list in consideration of at least one selected from the group consisting of a place information configuring each keyword item included in the keyword list, a time information configuring the each keyword item included in the keyword list, an information on the obtained current location and a current time, and providing a route guidance of a route from the obtained current location to the first guide point.

Accordingly, the present invention provides a mobile terminal capable of providing a more convenient navigation function.

In particular, in the course of being used by a user, the mobile terminal according to an example embodiment of the present invention extracts a keyword related to a destination then provides the user with a destination candidate in consideration of a schedule and a current location.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of various embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, or the like. Simply for discussion purposes, the description herein after will refer a mobile terminal, however, it should be appreciated that such teachings may equally apply to other types of terminals.

Figure 1:
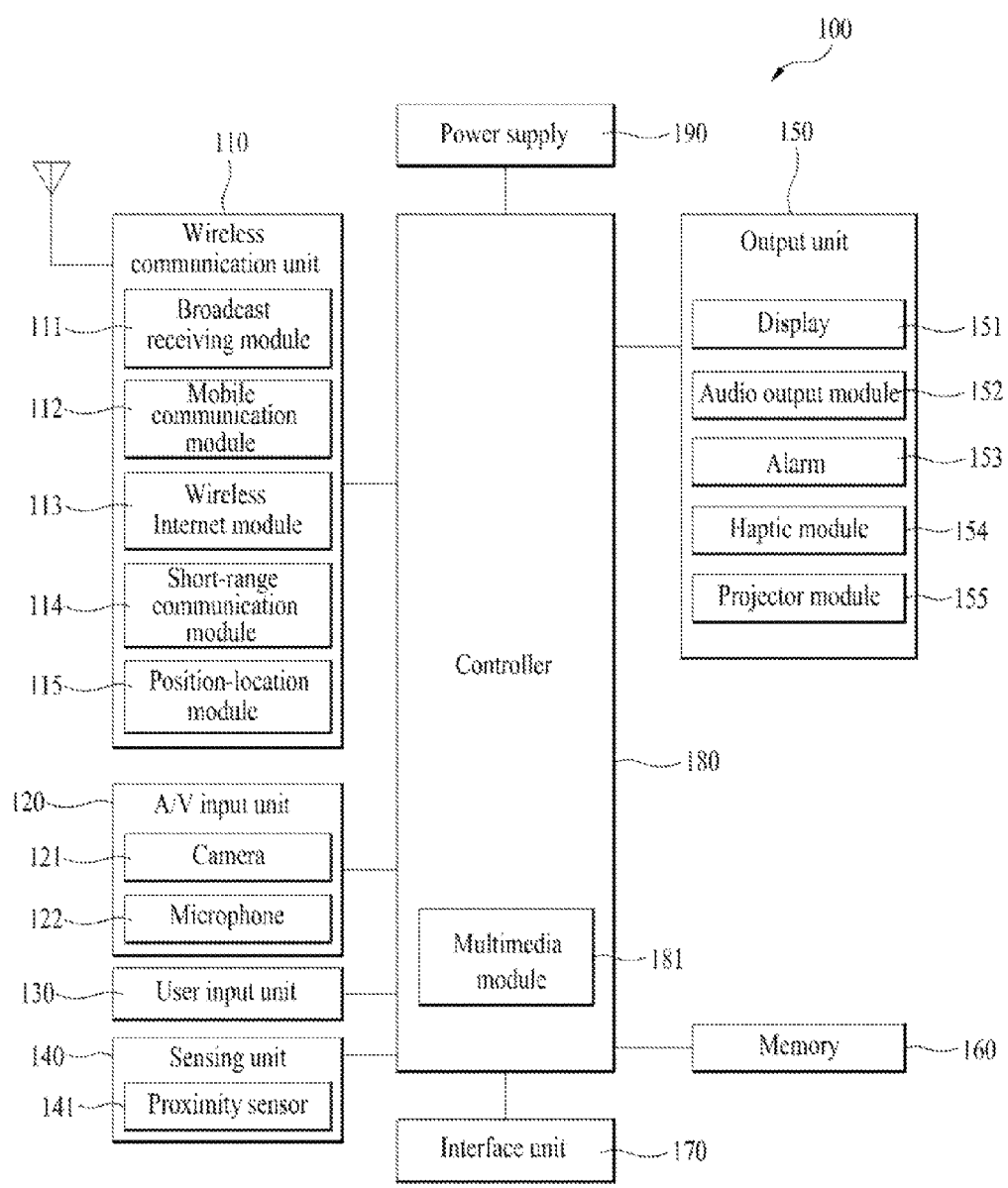
FIG. 1 is a block diagram of a mobile terminal according to one example embodiment of the present invention.

FIG. 1 is a block diagram of a mobile terminal 100 in accordance with an example embodiment of the present disclosure. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it should be understood that implementing all of the illustrated components is not a requirement, as greater or fewer components may alternatively be implemented.

The wireless communication unit 110 may typically include one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, or the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 may transmit/receive wireless signals to/from one or more network entities (e.g., base station, external terminal, server, etc.). Such wireless signals may represent audio, video, and data according to text/multimedia message transceiving, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), LTE (Long Term Evolution) or the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 may identify or otherwise obtain the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, or the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, or the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates output relevant to the senses of sight, hearing, touch or the like. In some cases, the output unit 150 may include the display 151, an audio output module 152, an alarm unit 153, a haptic module 154, a projector module 155, or the like.

The display 151 may typically be implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using, for example, a liquid crystal display (LCD), a thin film transistor-liquid crystal display (TFT-LCD), an organic light-emitting diode display (OLED), a flexible display, a three-dimensional display or another appropriate type of display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces (e.g., front surface and rear surface) of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch.' The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode, or the like, to output audio data which is received from the wireless communication unit 110 or is stored in the memory 160. During operation, the audio output module 152 may output audio relating to a particular function (e.g., call received, message received, etc.). The audio output module 152 may be implemented using one or more speakers, buzzers, or another appropriate type of audio producing devices, and combinations thereof.

The alarm unit 153 may output a signal for announcing the occurrence of a particular event associated with the mobile terminal 100. Typical events may include a call received event, a message received event a touch input received event or the like. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device or the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source generating light (e.g., laser) for projecting an image externally, an image producing element for producing an image to output externally using the light generated from the light source, and a lens for enlarging the image for output externally at predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module, or the like, according to a device type of a display means. In particular, the DLP module is operated by the mechanism of enabling the light generated from the light source to reflect on a DMD (digital micro-mirror device) chip and can be advantageous for the downsizing of the projector module 151.

The projector module 155 may be provided in a length direction of a lateral, front or backside direction of the mobile terminal 100. It should be appreciated that the projector module 155 can be provided on any appropriate portion of the mobile terminal 100 according to the necessity thereof.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory 160. Moreover, data for various patterns of vibration and/or sound outputted in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other appropriate type of memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically may control the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various example embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
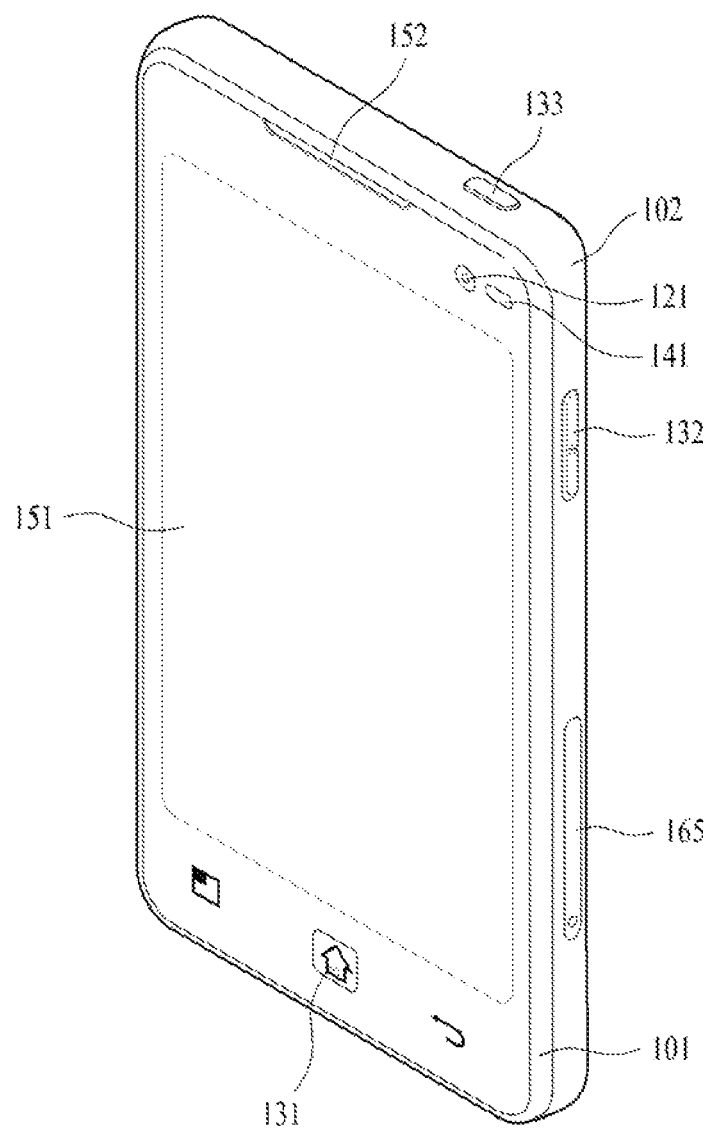
FIG. 2 is a front perspective diagram of a mobile terminal according to one example embodiment of the present invention.

FIG. 2 is a front perspective view of a mobile terminal according to various embodiments of the present disclosure. The mobile terminal 100 is shown as a bar type terminal body, but the mobile terminal may alternatively be implemented using other configurations such as folder-type, slide-type, rotational-type, swing-type, combinations thereof, or the like. For clarity, further disclosure will primarily relate to a bar-type mobile terminal 100, but such teachings apply equally to other types of mobile terminals.

Referring still to FIG. 2, the mobile terminal 100 may include a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti), or the like, for example.

A display 151, an audio output unit 152, a camera 121, user input units 130/131 and 132, a microphone 122, an interface 180, or the like, can be provided to the terminal body, and more particularly, to the front case 101.

The display 151 is shown occupying the majority of a main face of the front case 101. The audio output unit 151 and the camera 121 may be provided at an area adjacent to one of both end portions of the display 151, while the user input unit 131 and the microphone 122 may be provided at another area adjacent to the other end portion of the display 151. The user input unit 132 and the interface 170 can be provided on lateral sides of the front and rear cases 101 and 102.

The input unit 130 may be manipulated to receive a command for controlling an operation of the terminal 100. The input unit 130 may also include a plurality of manipulating units 131 and 132. The manipulating units 131 and 132 will sometimes be referred to herein as a manipulating portion or, button, switch, or the like, and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll or the like is inputted to the first manipulating unit 131. A command for volume adjustment of sound outputted from the audio output unit 152, a command for switching to a touch recognizing mode of the display 151, or the like, can be inputted to the second manipulating unit 132.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Route Guide in Consideration of Place Related Keyword, Time & Current Location

A mobile terminal according to one example embodiment of the present invention creates a keyword list of keywords collected in accordance with determination made by the controller 180 in the course of using the mobile terminal or keywords designated by a user is created, informs the user of information on a time and/or current location related to the keyword in association with a place, and is capable of performing a navigation function.

Figure 3:
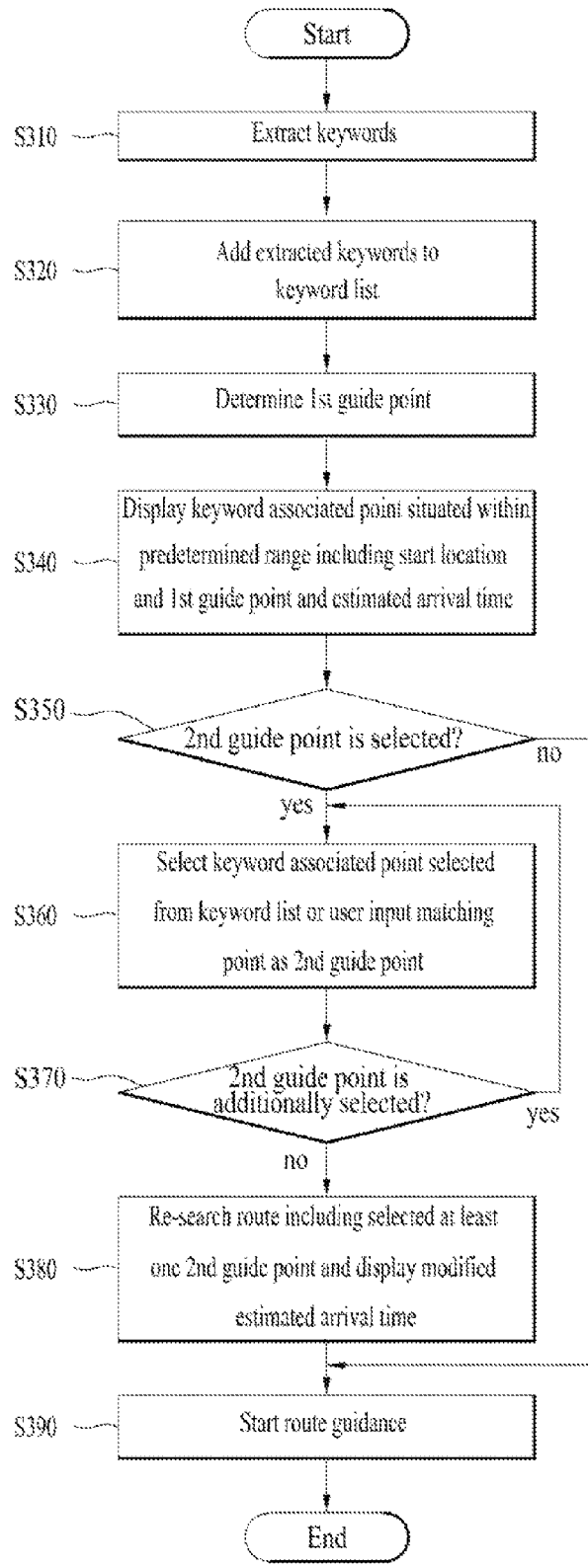
FIG. 3 is a flowchart for one example of a route guiding method according to one example embodiment of the present invention.

FIG. 3 is a flowchart for one example of a route guiding method according to one example embodiment of the present invention.

Referring to FIG. 3, in the course of using the mobile terminal, the controller 180 extracts a keyword [S310] and may be then able to add the corresponding keyword to a keyword list [S320]. In doing so, the keyword extraction may be performed in the course of activating various applications runnable in the mobile terminal. In particular, if the controller 180 determines keyword candidates and then informs a user of the determined keyword candidates via a prescribed visual effect and the like, a desired keyword, which will be added to the keyword list, may be specified in a manner that the user selects at least one portion of the keyword candidates. A keyword may be automatically added to the keyword list without user's confirmation in accordance with a determination made by the controller 180. As references for the controller 180 to extract keywords (or keyword candidates), it may be able to consider simple place information, information related to a schedule including a place, information on an operation and a target of the operation, information related to articles required for performing a previously saved schedule and the like, by which the references may be non-limited.

The keyword list may be saved in the memory 160. Each keyword item to be saved in the keyword list may be configured with an extracted time, a place, an operation, a target of the operation, an identity or combination thereof. In case that a name of a place is specified in the keyword item, the controller 180 performs an address search with the specified name. If the name of the place is not included in the keyword item, the controller 180 searches for a place and address related to the keyword item using the rest of the informations, adds address information to the keyword item, and then saves the address information added keyword item. In case that there are a plurality of places having the same name or a plurality of places found using the rest of the informations except the name of the place, the controller 180 may be able to update the address information on each keyword item in order of vicinity in consideration of a current location. Therefore, a keyword item may be regarded as related to a place.

Thereafter, the controller 180 may be able to determine a first guide point in response to a user's command input [S330]. In doing so, the controller 180 may be able to control a menu, which is provided to enable a user to confirm whether to set the first guide point to the place for the specific keyword item in consideration of at least one of the time information, the place information and the current location included in the each keyword item contained in the keyword list, to be displayed in a prescribed form on the touchscreen 151. For instance, in case that there exists a keyword item including place information without time information, the controller 180 may be able to display indication information related to the corresponding keyword item if the mobile terminal approaches the corresponding place in a prescribed distance or when it is determined that the corresponding place is within a threshold distance from the current location of the mobile terminal 100. In one example embodiment, a value of the threshold distance may vary depending on the speed of the mobile terminal moving. For example, if it is determined that the mobile terminal 100 is not moving or the speed is less than a first threshold speed, the controller 180 may assume that the user of the mobile terminal 100 is stationary or walking. Alternatively, if it is determined that the speed is greater than a second threshold speed, the controller 180 may assume that the user of the mobile terminal 100 is moving at a fast speed, i.e., in a car or train. Accordingly, the value of the threshold distance would be greater when the speed is greater than the second threshold speed compared to when the speed is less than the first threshold speed.

For another instance, in case that there exists a keyword item including both time information and place information, the controller 180 may be able to simply display indication information related to the corresponding keyword item when a corresponding time has come or the time associated with the keyword item is within a threshold time period with respect to the current time. Similar to the above discussed variable value of the threshold distance, a value of the threshold time period may also vary depending on the speed of the mobile terminal 100 moving. For example, the value of the threshold time period may be greater at a lower speed of the mobile terminal 100. The transportation type may also be designated by the user and the controller 180 may calculate the distance and time required with respect to the keyword item according to the designated transportation type.

For another instance, in case that there exists a keyword item including both time information and place information, the controller 180 calculates a time required for going to a corresponding place from a current location and may be then able to display indication information related to the corresponding keyword item at a timing point prior to the required time from the corresponding time. If a user selects the displayed indication information, the place corresponding to the keyword item may be determined as the first guide point. To this end, the controller 180 may be able to continuously monitor whether the place contained in the keyword item included in the keyword list is approached, whether the time has come, and/or the current location. Alternatively, a point corresponding to one of a random point and a keyword item included in the keyword list may be determined as the first guide point in response to a user's command input via the user input unit (e.g., the touchscreen).

Once the first guide point is determined, a place (i.e., a keyword associated place) corresponding to a keyword item situated within a predetermined range including a start location and the first guide point, a distance from the start location to the first guide point, a time required for going to the first guide point from the start location and the like may be displayed on the touchscreen [S340]. In this case, a start point may include a current location of the mobile terminal or a location set up by a user. Moreover, the start location, the first guide point and the keyword associated place nearby the first guide point may be displayed as a list (i.e., a list view) or may be displayed on a map (i.e., a map view). A list view mode and a map view mode may be switched to each other in response to a user's input. This shall be described in detail later.

Subsequently, the user may be able to additionally select at least one second guide point [S350]. In particular, the user may be able to select the place related to the keyword included in the keyword list, the keyword associated place displayed in the map/list view or a point directly inputted by the user as the second guide point [S360]. In case that a plurality of the second guide points are selected, the step S360 may be iteratively performed [S370].

Once the selection of the second guide point is completed, the controller 180 searches for a route including the first guide point and the at least one second guide point and may be then able to control a modified route information and an estimated arrival time to be displayed on the touchscreen [S380].

Subsequently, if the user inputs a route guide initiation command, the controller 180 may be able to start the route guidance [S390].

Meanwhile, in case that the user does not additionally select the second guide point, the route guidance of the route from the start location to the first guide point may be directly initiated [S350, S390].

Although the user fails to select the second guide point, if a place related to a different keyword item exists on a route between the current location and the first guide point or nearby two points, the controller 180 may control the existing place to be automatically added as the second guide point or recommended to the user.

In the following description, a method of extracting a keyword and adding the extracted keyword to a keyword list is explained with reference to FIG. 4 and FIG. 5.

Figure 4:
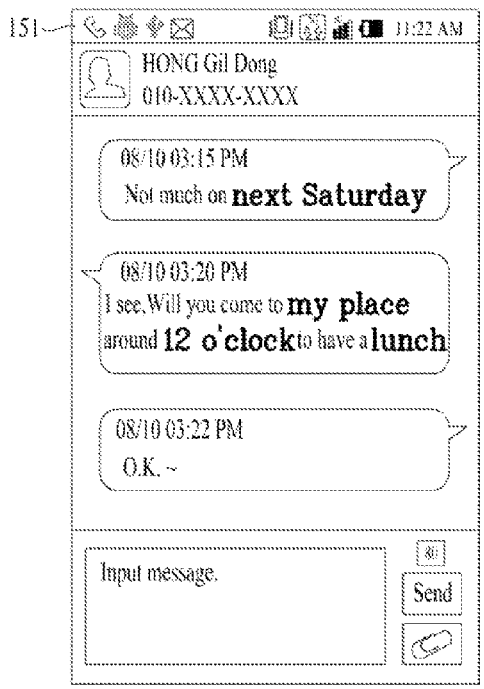
FIG. 4 is a diagram of display screen configuration for one example of a process for extracting a keyword from a text message application in a mobile terminal according to one example embodiment of the present invention.
Figure 4:
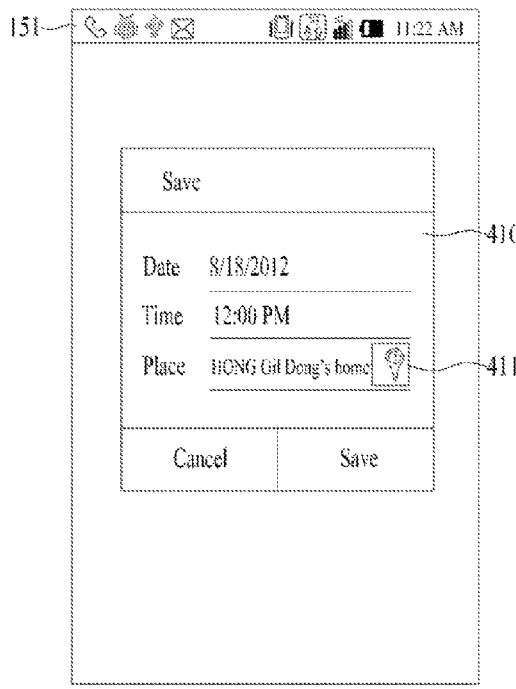
Figure 4:
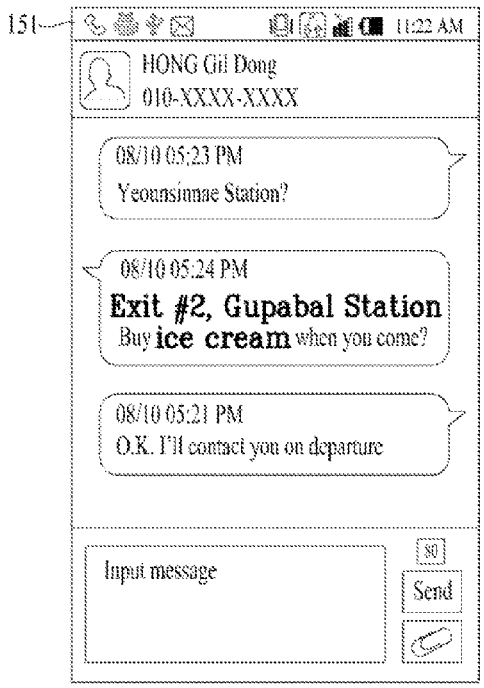
Figure 4:
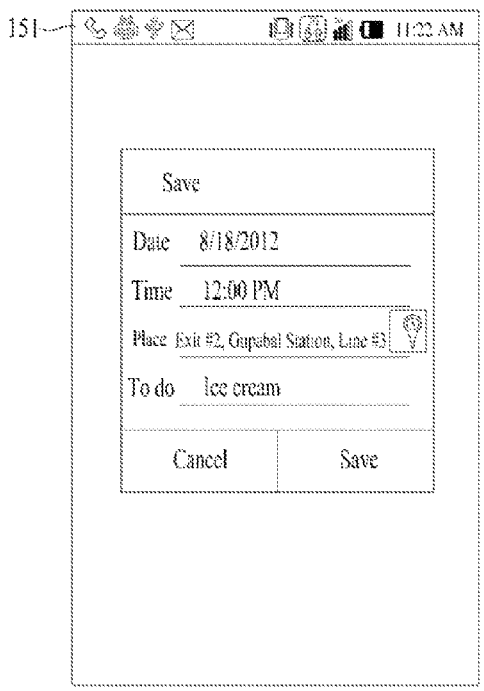

FIG. 4 is a diagram of display screen configuration for one example of a process for extracting a keyword from a text message application in a mobile terminal according to one example embodiment of the present invention.

Referring to FIG. 4, as a text message application is activated, a message thread exchanged with a counterpart is displayed on a text touchscreen 151 [FIG. 4 (*a*)]. In doing so, the controller 180 extracts words related to times or places as keywords and may be then able to give a prescribed visual effect (e.g., highlight) to the extracted words. In doing so, if a user selects the visual effect, a menu 410, which enables the user to determine whether to save the extracted information as a single keyword item, may be displayed [FIG. 4 (*b*)]. In case that information, which may be associated with a different application, is included in the extracted information, e.g., in case that a location of HONG Gil Dong home is saved in a phonebook or searchable, as shown in FIG. 4 (*b*), an icon 411 for paging a map application can be displayed on the menu 410. In doing so, if the user selects a save button from the menu 410, information included in the menu 410 may be saved as a single keyword item in the keyword list.

In a situation shown in FIG. 4 (*a*), as a message exchange further proceeds, the controller 180 may be able to extract keywords additionally. In particular, in case that an operation to be performed on 'ice cream' is 'buy' [FIG. 4 (*c*)], the controller 180 links 'ice cream' to 'exit #2, Gupabal Station' and may be then able to save the linked words as a single keyword item [FIG. 4 (*d*)]. In doing so, although 'Line #3' of a place field shown in FIG. 4 (*d*) is not directly mentioned in the message thread shown in FIG. 4 (*c*), the controller 180 performs a search with 'Gupabal Station' and may then display the found 'Line #3'. This search may be performed using a database previously saved in the memory 160 or may include an internet search via a wireless communication unit.

Figure 5:
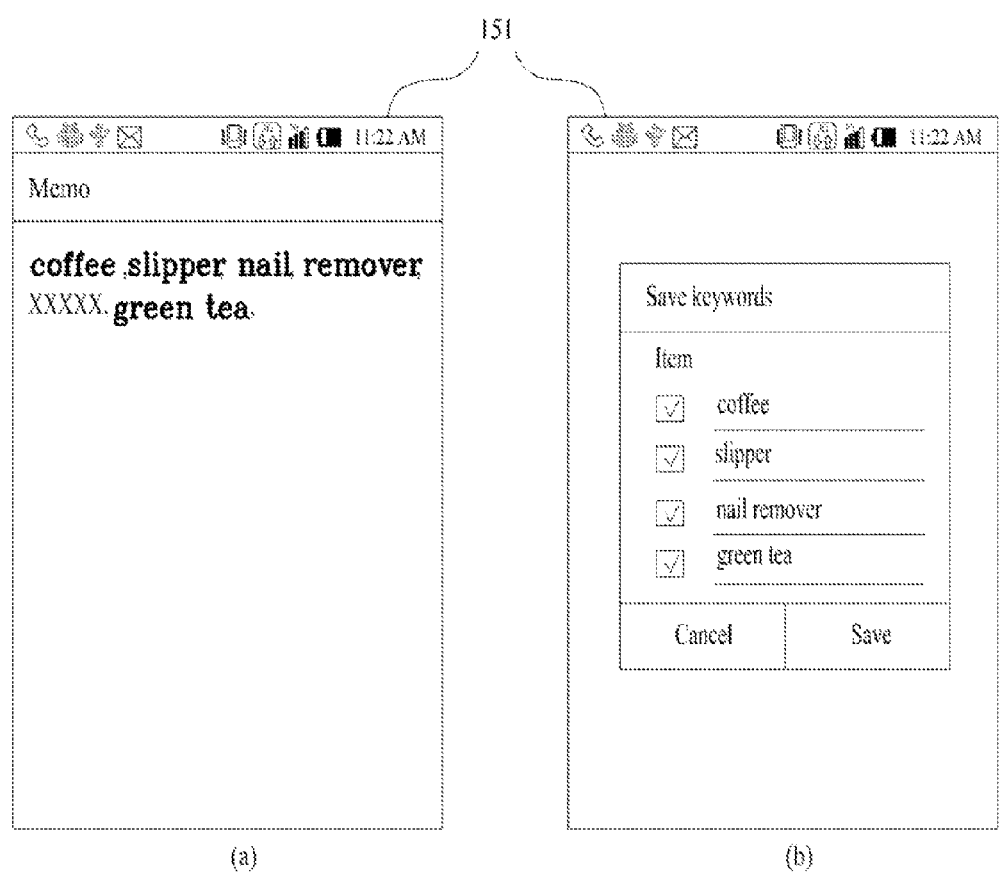
FIG. 5 is a diagram of display screen configuration for one example of a process for extracting a keyword from a memo application in a mobile terminal according to one example embodiment of the present invention.

FIG. 5 is a diagram of display screen configuration for one example of a process for extracting a keyword from a memo application in a mobile terminal according to one example embodiment of the present invention.

Referring to FIG. 5 (*a*), as a memo application is activated, a memo content inputted by a user is displayed on the touchscreen 151. In doing so, the controller 180 extracts keywords in accordance with prescribed reference and may be then able to give such a prescribed visual effect as a bold effect to the extracted keywords.

Referring to FIG. 5 (*b*), if the visual effect given keywords are selected, the controller 180 may be able to display the extracted keywords on the touchscreen 151 in a manner of sorting the keywords into a check box type list. Subsequently, the user may be able to save/delete the keywords in/from a keyword list by sorting out the keywords by entity unit in a manner of selecting check boxes respectively corresponding to the desired keywords and then saving the selected check boxes.

Meanwhile, the visual effect may not be further represented on the memo content corresponding to the keywords saved in the keyword list.

The keyword extracting process and the applications applied thereto are exemplarily described with reference to FIG. 4 and FIG. 5, by which the present invention may be non-limited. Moreover, a desired keyword can be added to a keyword list by various methods using various applications. For instance, a keyword may be extracted from a schedule management application and a keyword related to a person or contact may be extracted from an address book application. For another instance, the controller 180 performs voice recognition on a voice of a user or a voice of a call counterpart in the course of an ongoing voice call and may be then able to extract a keyword from a voice recognition performed result.

In the following description, a process for performing a navigation function in accordance with the keywords added in FIG. 4 is explained with reference to FIG. 6 and FIG. 7.

Figure 6:
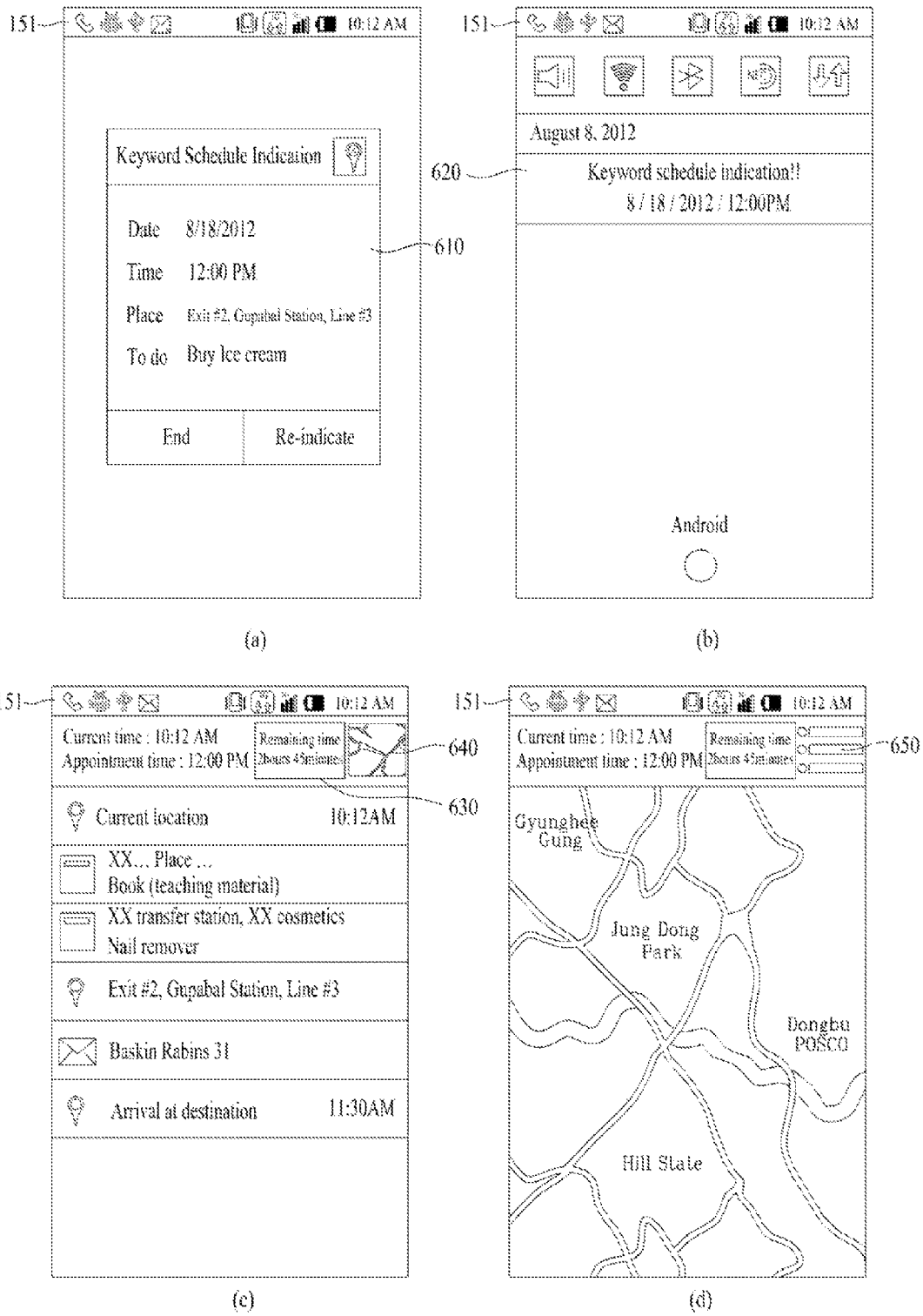
FIG. 6 is a diagram of display screen configuration for one example of a process for activating a navigation function in time of a schedule in a mobile terminal according to one example embodiment of the present invention.

FIG. 6 is a diagram of display screen configuration for one example of a process for activating a navigation function in response to indication information displayed in accordance with time information on a specific keyword item in a mobile terminal according to one example embodiment of the present invention.

Referring to FIG. 6, assume a case that a keyword item related to an ice cream purchase is saved in a keyword list by the steps shown in FIG. 4 (*c*) and FIG. 4 (*d*).

Referring to FIG. 6 (*a*), in consideration of a timing point indicated by time information included in a keyword item related to an ice cream purchase and a time required for going to a place indicated by place information included in the corresponding keyword item from a current place, the controller 180 may be able to inform a user of information on the corresponding keyword item via an indication popup window 610 at a timing point for the user to reasonably perform a corresponding schedule. Together with or instead of the popup window, an indication information 620 on the keyword item may be displayed on a quick panel, as shown in FIG. 6 (*b*). In this case, the quick panel may mean a layer that is gradually displayed toward a bottom end when an indicator region provided to a top end of the touchscreen is dragged in bottom direction.

In case that the user selects the indication popup window 610 or the indication information 620 displayed on the quick panel, referring to FIG. 6 (*c*), a guide point list of a list view type may be displayed. An information 630 on a remaining time until a schedule and a map view switch menu button 640 for switching to a map view may be arranged on a top end of the guide point list. A current location, which is a start point, and a current time are displayed on a most top end of the guide point list and a first guide point and an estimated arrival time may be displayed on a most bottom end of the guide point list. In doing so, the controller 180 may be able to automatically search for and display passing-through possible points between the first guide point and the current location using the place information of the keyword item included in the keyword list. An icon indicating that the keyword item matching the corresponding guide point is extracted from which application may be displayed on the left side of each of the guide point items.

If the switch menu button 640 is selected in the list view mode, referring to FIG. 6 (*d*), a guide point may be displayed on the map in map view mode. If a switch menu button 650 displayed on a top end is selected in the map view mode, the map view mode may be switched to the list view mode shown in FIG. 6 (*c*).

If a screen is switched without having an end menu selected in the situation shown in FIG. 6 (*a*) (e.g., a home key button manipulation, an incoming call, etc.) or the indication menu is selected again, the indication information 620 may keep remaining on the quick panel. Moreover, a visual effect may be given to the indication information 620 displayed on the quick panel to indicate a cumulative count of reselections of the indication menu, an imminent time until a schedule time, or an increasingly extended time having the indication information failing to be checked. This visual effect may be given to the location matching the corresponding indication information on the map view.

Meanwhile, a user checks whether a passing-through possible point exists nearby a specific guide point by among places for a keyword item included in a keyword list and may be then able to additionally designate the existing passing-through possible point as a guide point. This is described with reference to FIG. 7 as follows.

Figure 7:
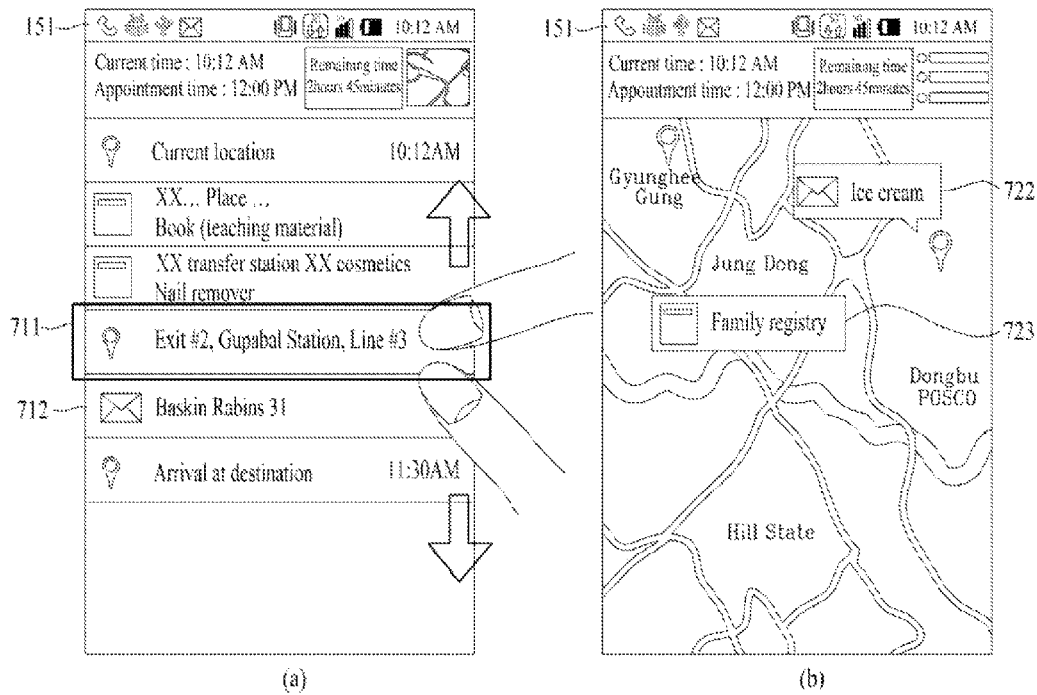
FIG. 7 is a diagram of display screen configuration for one example of a process for adding a second guide point in a mobile terminal according to one example embodiment of the present invention.
Figure 7:
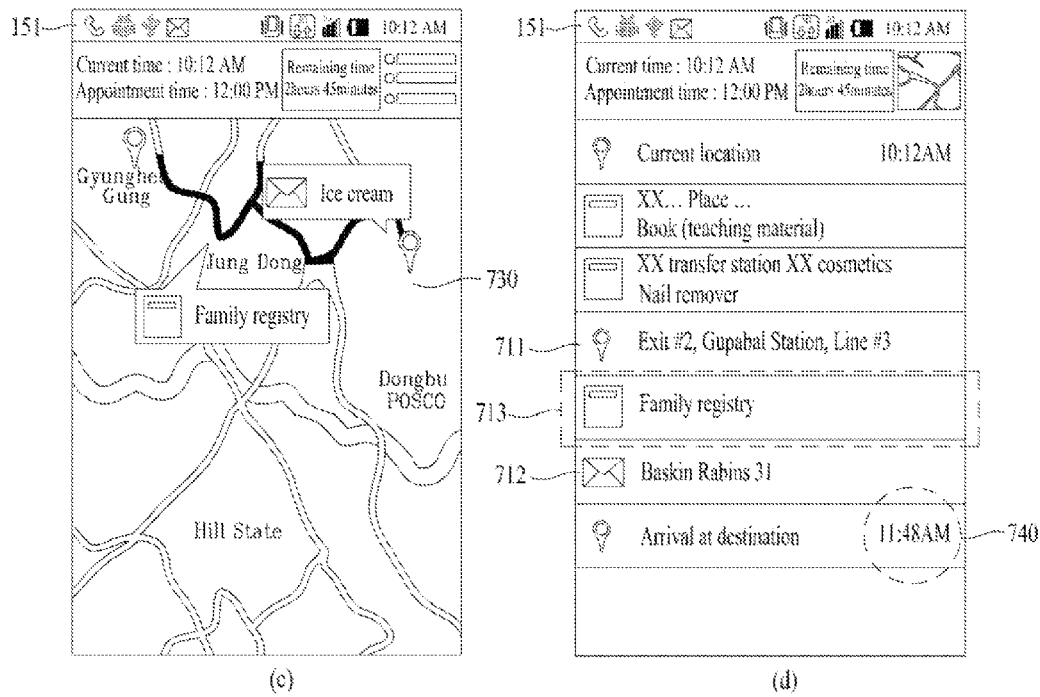

FIG. 7 is a diagram of display screen configuration for one example of a process for adding a second guide point in a mobile terminal according to one example embodiment of the present invention. Particularly, assume that the process shown in FIG. 7 is subsequent to the former process shown in FIG. 6.

Referring to FIG. 7 (*a*), in order to check whether a passing-through possible place exists nearby a specific guide point, a user may be able to select an item 711 matching the specific guide point by performing a touch input thereon. In case of attempting to check a passing-through possible place between two guide points 711 and 712, the user touches the guide points with different fingers and may then drag the fingers in a manner that a distance between the touched points increases.

If an area to be searched for the passing-through possible places is selected by one of the above-described methods, the controller 180 searches the keyword list for a keyword item including information on a place adjacent to the selected area and may be then able to display the corresponding result in map view mode, as shown in FIG. 7 (*b*). Referring to FIG. 7 (*b*), the guide point 722 for the keyword 'ice cream' and a local community center 723 for issuing a certificate nearby the guide point 722 are found as the passing-through possible places.

If the user selects the local community center 723, referring to FIG. 7 (*c*), a route 730 including the local community center 723 is displayed in map view. As the switch menu is selected, if the map view is switched to the list view, referring to FIG. 7 (*d*), an item 713 matching the newly selected guide point may be additionally displayed between the 2 selected guide point items 711 and 712. As the passing-through possible place is selected, an estimated arrival time 740 of an arrival at a final destination may be updated and displayed.

In the following description, a case of selecting a first guide point from a keyword list is explained with reference to FIG. 8 and FIG. 9.

Figure 8:
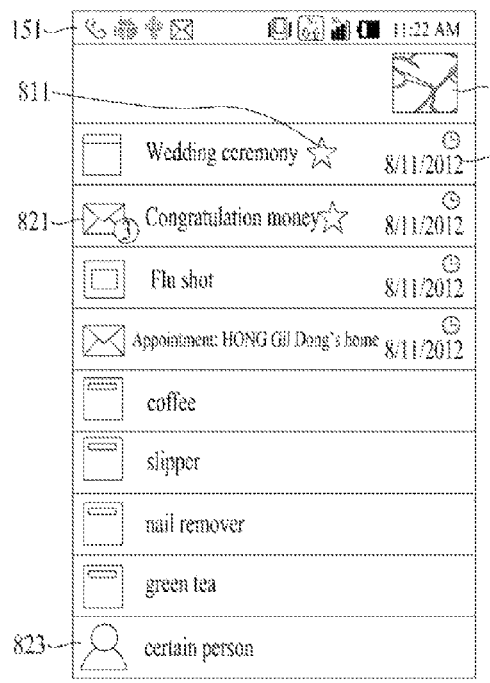
FIG. 8 is a diagram of display screen configuration for one example of a method of selecting a first guide point from a keyword list in a mobile terminal according to one example embodiment of the present invention.
Figure 8:
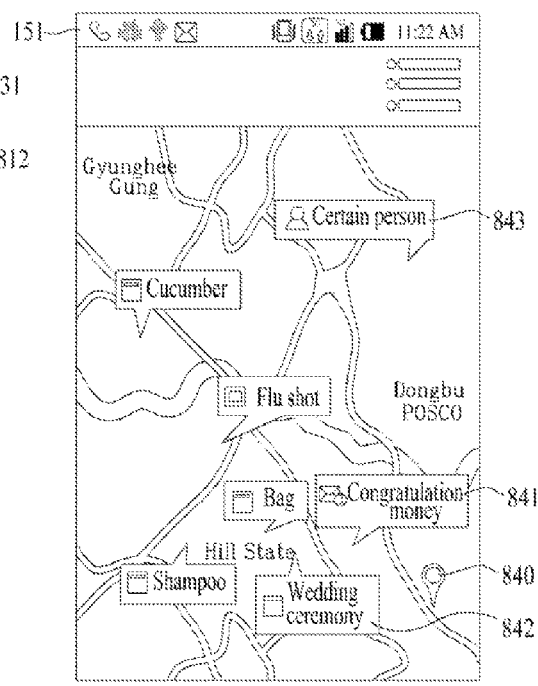
Figure 8:
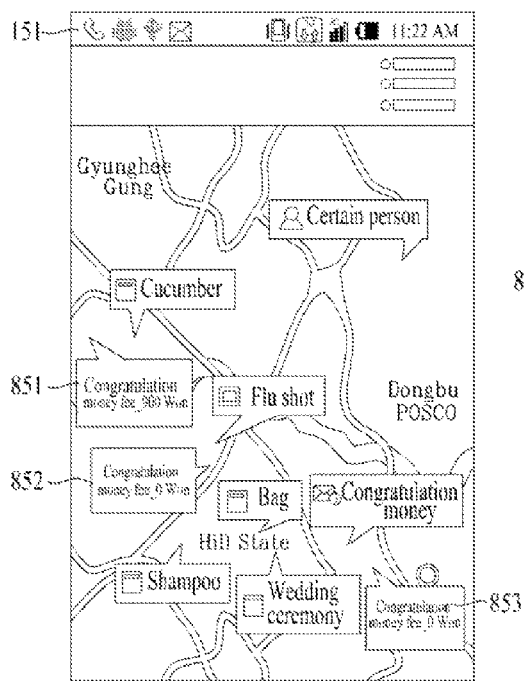
Figure 8:
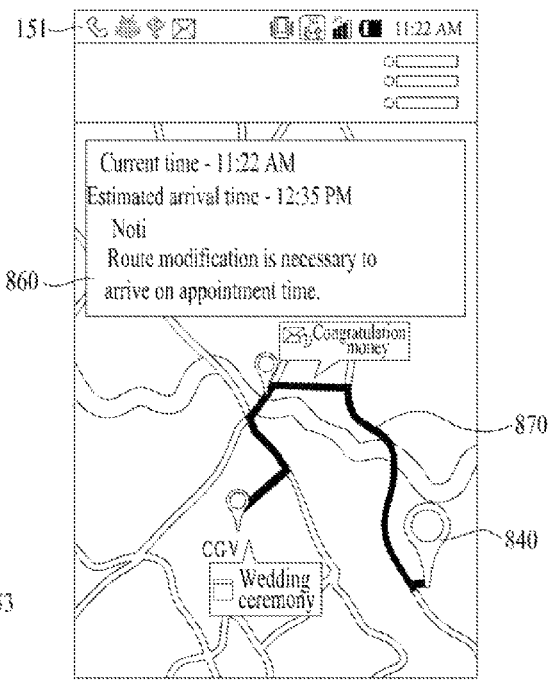

FIG. 8 is a diagram of display screen configuration for one example of a method of selecting a first guide point from a keyword list in a mobile terminal according to one example embodiment of the present invention.

Referring to FIG. 8 (*a*), if a user inputs a keyword list paging command, the controller 180 may be able to display a keyword list on the touchscreen 151. In doing so, a time information 812 is displayed on a keyword item including time information. If a time information closing is imminent, an indicator 811 may be additionally displayed to indicate that the timing information closing is imminent. An icon indicating an application, from which the corresponding keyword item is collected, may be displayed on the left side of each keyword item. In case that the same keyword item is extracted from the same application multiple times, a corresponding extraction count 821 may be displayed on the corresponding icon. And, a different user, who shares location information, may be displayed as a human-shaped icon 823 on a left side of the corresponding keyword item. The order of displaying the keyword items on the keyword list may be determined in consideration of at least one of a priority designated by a user, a closing imminent order according to time information and a distance from a current location.

If a switch menu button 831 is selected, referring to FIG. 8 (*b*), a map view is entered so that keyword item matched places existing in a predetermined range with reference to the current location 840 can be displayed. A prescribed visual effect may be given to the place having a high priority among the places displayed on a map. For instance, if a place 842 matching a keyword 'wedding ceremony' and a place 841 matching a keyword 'congratulation money' have high priorities, respectively, an outline effect may be given to each of the places 842 and 841. In doing so, if a different user, who shares location information, exists on the displayed map, a location 843 of the corresponding user may be displayed as well.

If the user selects a place that matches a specific keyword, additional information on the selected place may be further displayed. For instance, if the place 841 matching the wedding celebration money is selected [FIG. 8 (*b*)], the controller 180 searches for locations of nearby ATMs and fee information on each of the ATMs and may then display the results 851 and 852 on the map [FIG. 8 (*c*)]. Subsequently, the user may be able to sequentially select a guide point for the place corresponding to a specific ATM and a guide point for the place corresponding to a wedding ceremony through a touch input (e.g., a long touch) of a specific pattern. In this case, the additional information may be obtained through a web search or may include information recommended through SNS application.

Once the selection of the guide point is completed, referring to FIG. 8 (*d*), the controller 180 determines the selected location as the guide point and may be then able to display a route 870 from a start point 840. The controller 180 may be able to display an estimated required time of the route including the selected guide point. In case that an arrival is not possible until an expiry timing point in consideration of a current time, a required time for going to a final guide point and a time information on the final guide point, the controller 180 may be able to display a warning text 860. Moreover, if the selection of the guide point is completed, a menu for selecting transportation means (e.g., on-foot, car, bus, subway, etc.) may be provided [not shown in the drawing]. In doing so, if the transportation means is selected, a route and estimated required time may be updated in accordance with the selected transportation means.

In the following description, a method of deleting a guide completed keyword item is explained with reference to FIG. 9.

Figure 9:
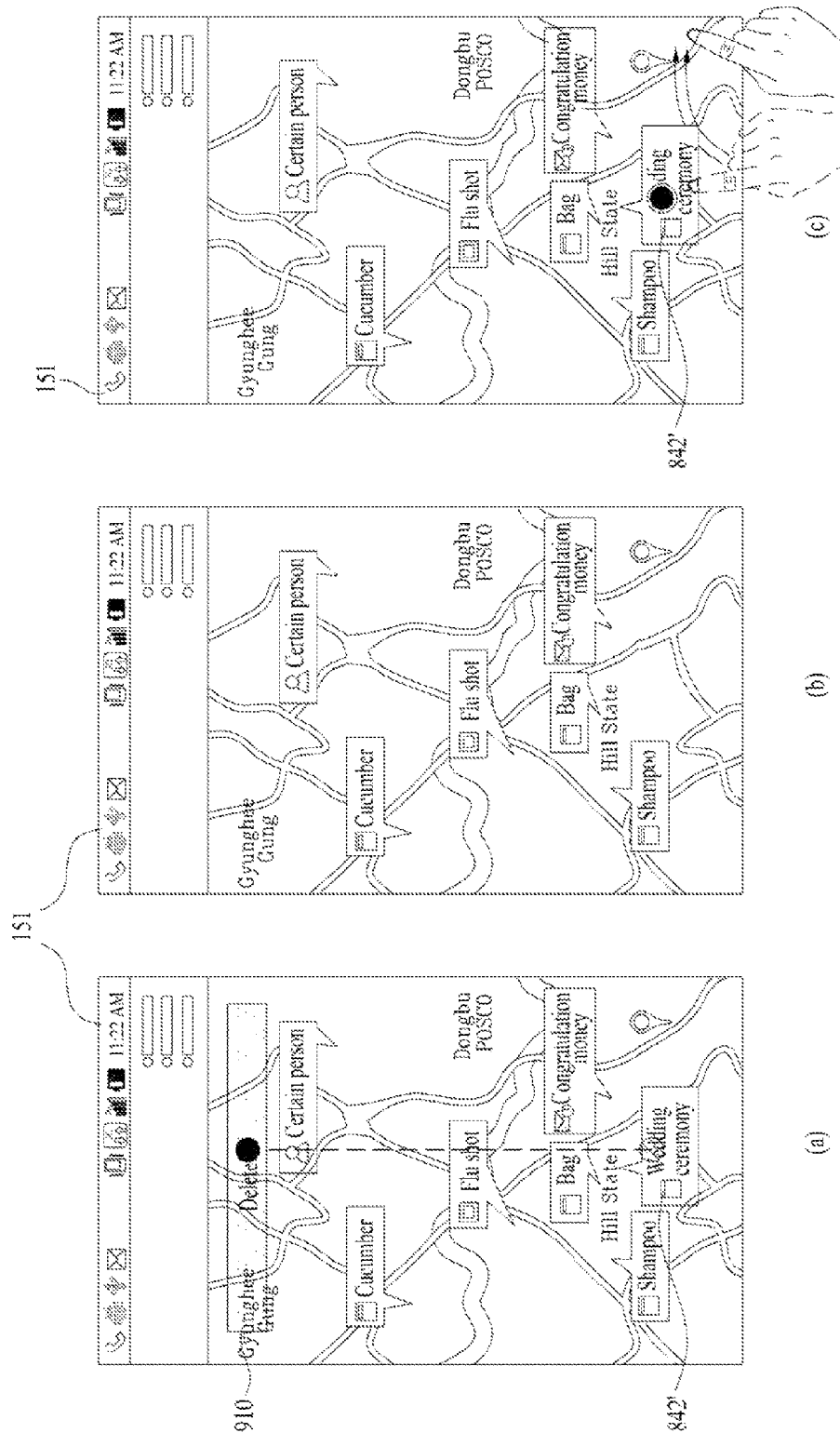
FIG. 9 is a diagram of display screen configuration for one example of a method of deleting a completed keyword item in a mobile terminal according to one example embodiment of the present invention.

FIG. 9 is a diagram of display screen configuration for one example of a method of deleting a completed keyword item in a mobile terminal according to one example embodiment of the present invention.

Referring to FIG. 9, assume a situation that the guide for the route designated by the process described with reference to FIG. 8 is already completed.

Referring to FIG. 9, if an item 842' matching the keyword 'wedding ceremony', of which guidance has been completed in the map view mode, is selected, a delete menu 910 may be displayed [FIG. 9 (*a*)]. While the delete menu 910 is displayed, if the corresponding item 842' is dragged & dropped onto the delete menu 910, the corresponding item may disappear from the map view [FIG. 9 (*b*)]. In this case, the corresponding item may be deleted from the keyword list as well. In case that the corresponding item 842' is dragged & dropped onto an edge of the touchscreen 151, the corresponding item may be deleted [FIG. 9 (*c*)].

Figure 10:
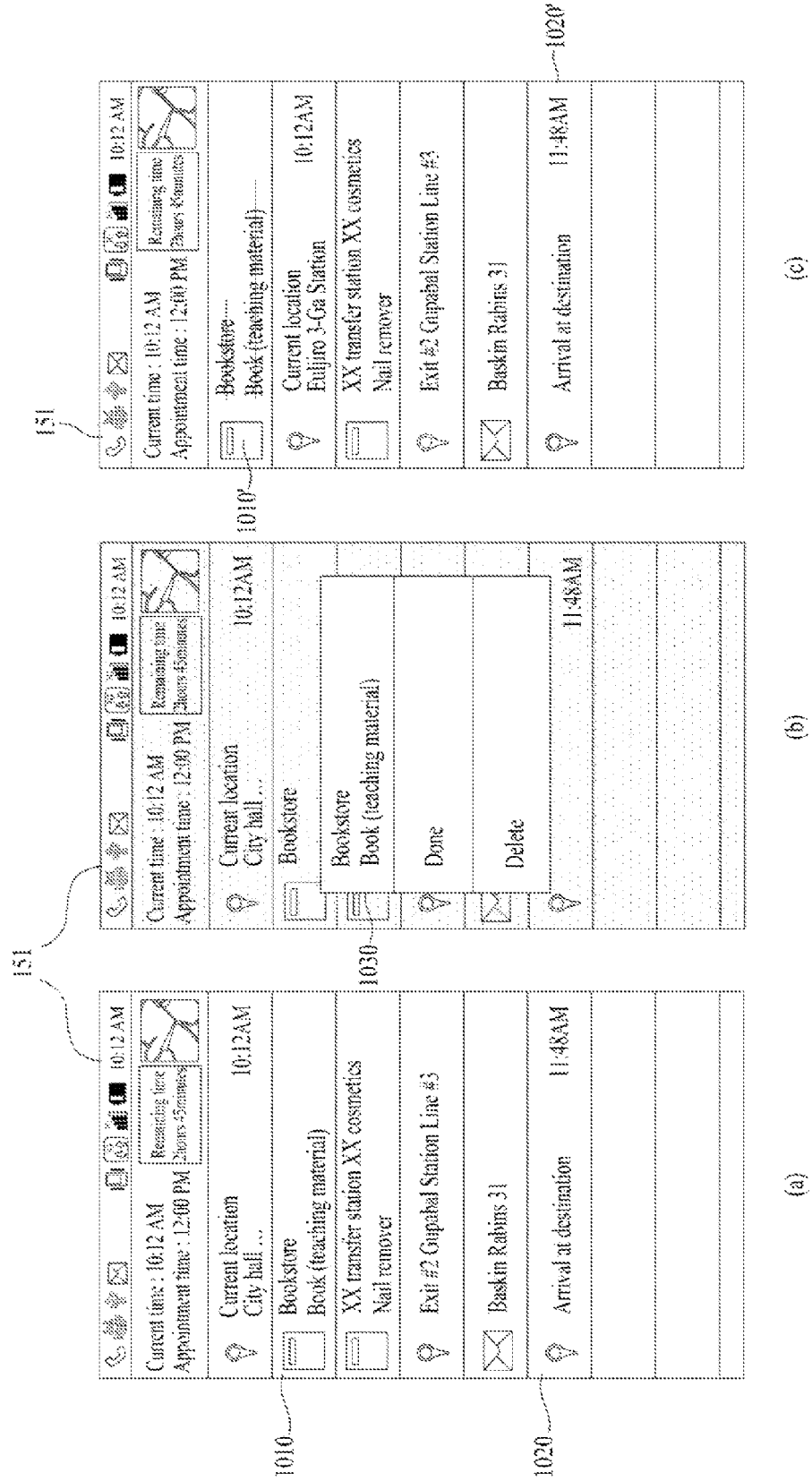
FIG. 10 is a diagram of display screen configuration for one example of a method of deleting a guide point in a list view state in a mobile terminal according to one example embodiment of the present invention.

FIG. 10 is a diagram of display screen configuration for one example of a method of deleting a guide point in a list view mode in a mobile terminal according to one example embodiment of the present invention. In FIG. 10, assume a process subsequent to the situation shown in FIG. 6 (*c*) for example.

Referring to FIG. 10, in case of attempting to delete a second guide point item 1010 from the guide points displayed in list view mode, a user may be able to select the corresponding item 1010 by performing a touch input thereon [FIG. 10 (*a*)]. Hence, it may be able to display a popup window to select whether the corresponding item will be changed into a guide completed state or deleted from the list view [FIG. 10 (*b*)]. If 'delete' is selected, the corresponding item may be deleted from the keyword list. If 'done' is selected, the corresponding item may not be deleted from the keyword list despite disappearing from the list view. Alternatively, if 'done' is selected, the corresponding item may be deleted from the keyword list by the former method described with reference to FIG. 9.

Once 'delete' or 'done' is selected in FIG. 10 (*b*), the corresponding item 1010' is deleted and then displayed on a top end by changing its position [FIG. 10 (*c*)]. Hence, an estimated arrival time 1020 shown in FIG. 10 (*a*) is re-calculated and an updated estimated arrival time is then displayed [FIG. 10 (*c*)].

In the following description, a method of extracting a keyword from preset alarm information and then adding a place information required for a corresponding alarm to a keyword list is explained with reference to FIG. 11.

Figure 11:
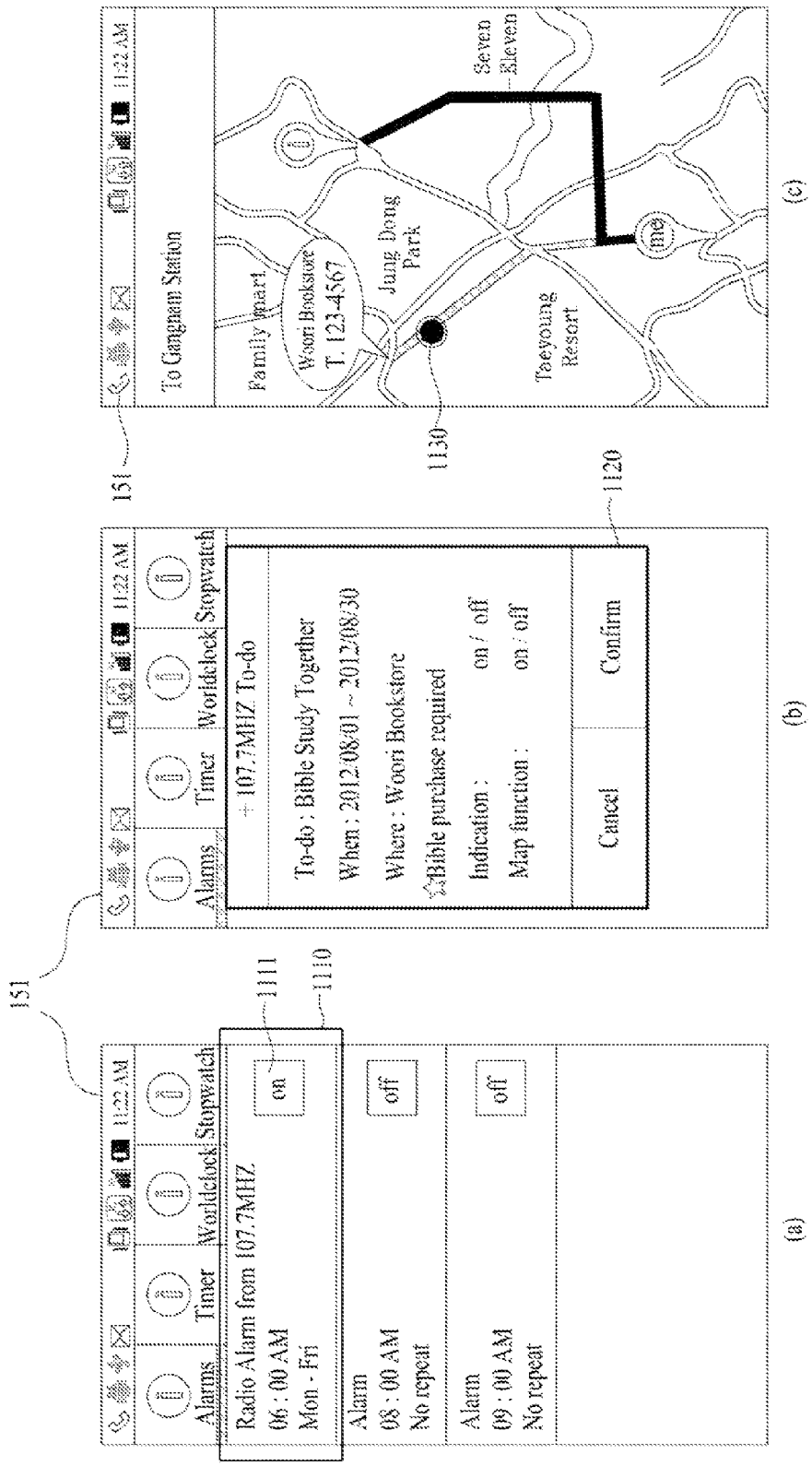
FIG. 11 is a diagram of display screen configuration for one example of a process for extracting a keyword from an alarm application in a mobile terminal according to one example embodiment of the present invention.

FIG. 11 is a diagram of display screen configuration for one example of a process for extracting a keyword from an alarm application in a mobile terminal according to one example embodiment of the present invention.

Referring to FIG. 11, if a user sets up an alarm 1110 including a frequency information and a time information and then selects an activate button 1111 in order to listen to a radio program, the controller 180 may be able to obtain information on the program broadcasted on the corresponding frequency and time in a manner of obtaining a radio schedule by an internet search [FIG. 11 (*a*)]. The controller 180 extracts a keyword from the obtained information. As a result of the extraction, if a purchase of a book is necessary, the controller 180 may be able to control a popup window 1120, which is provided to add a keyword item shown in FIG. 11 (*b*), to be displayed on the touchscreen 151. If the user selects 'OK (add keyword item)' from the popup window 1120, the corresponding information is added to the keyword list. If a broadcast time is imminent or a current location is adjacent to a bookstore, the controller 180 outputs an indication information (not shown in the drawing) is outputted in a manner similar to that shown in FIG. 6 (*a*) or FIG. 6 (*b*) and may be then able to guide a route to the bookstore 1130 [FIG. 11 (*c*)]. Meanwhile, even if the alarm shown in FIG. 11 is not set up, the controller 180 obtains a user's pattern (e.g., user's flow line, etc.) and may be then able to add a keyword item.

In the following description, in case that a place matching a specific keyword item included in a keyword list is adjacent to a current location, a process for executing a navigation function according to the present invention is explained with reference to FIGS. 12 to 14.

Figure 12:
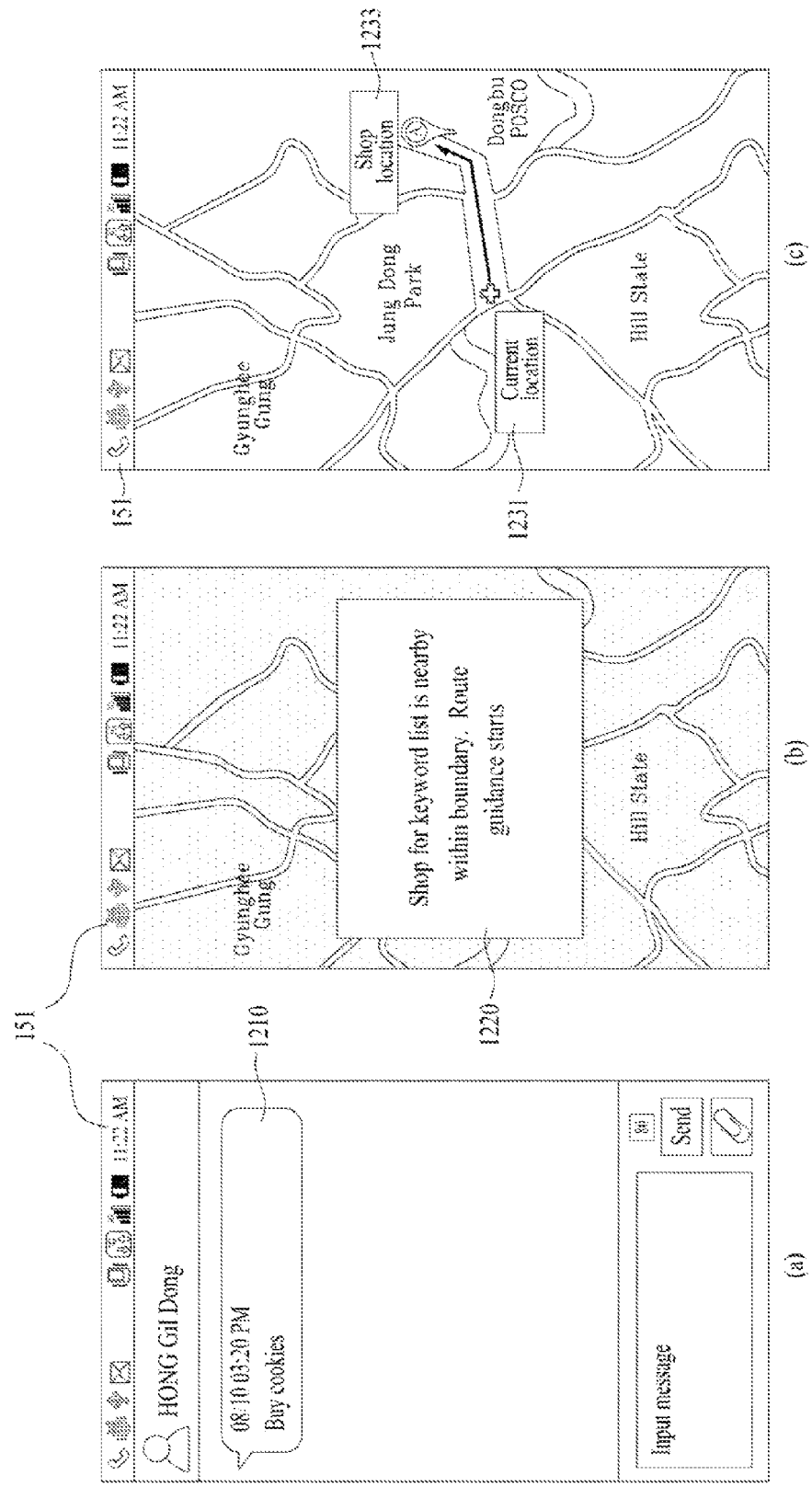
FIG. 12 is a diagram of display screen configuration for one example of a process for activating a navigation function in response to a place in a mobile terminal according to one example embodiment of the present invention.

FIG. 12 is a diagram of display screen configuration for one example of a process for activating a navigation function in response to a place in a mobile terminal according to one example embodiment of the present invention.

Referring to FIG. 12, a message 1210 containing a text 'buy cookies' is displayed via a text message application [FIG. 12 (*a*)]. In doing so, the controller 180 determines that an object of an action 'buy' is 'cookies' and may be then able to add the corresponding word as a single keyword item to a keyword list. Subsequently, the controller 180 detects whether a shop for buying cookies exists in a predetermined distance from a current location by real time or prescribed periods. If the shop is detected, the controller 180 may be able to control an indication information 1220 to be displayed on the touchscreen 151 [FIG. 12 (*b*)]. If the indication information 1220 is selected, the current location 1231, the location 1233 of the shop and a recommended route can be displayed on a map in map view mode [FIG. 12 (*c*)].

Meanwhile, after a first guide point has been set, while a navigation function is active, if a current location is adjacent to a place matching a specific keyword item, the corresponding place may be added as a second guide point. This case is described with reference to FIG. 13 as follows.

Figure 13:
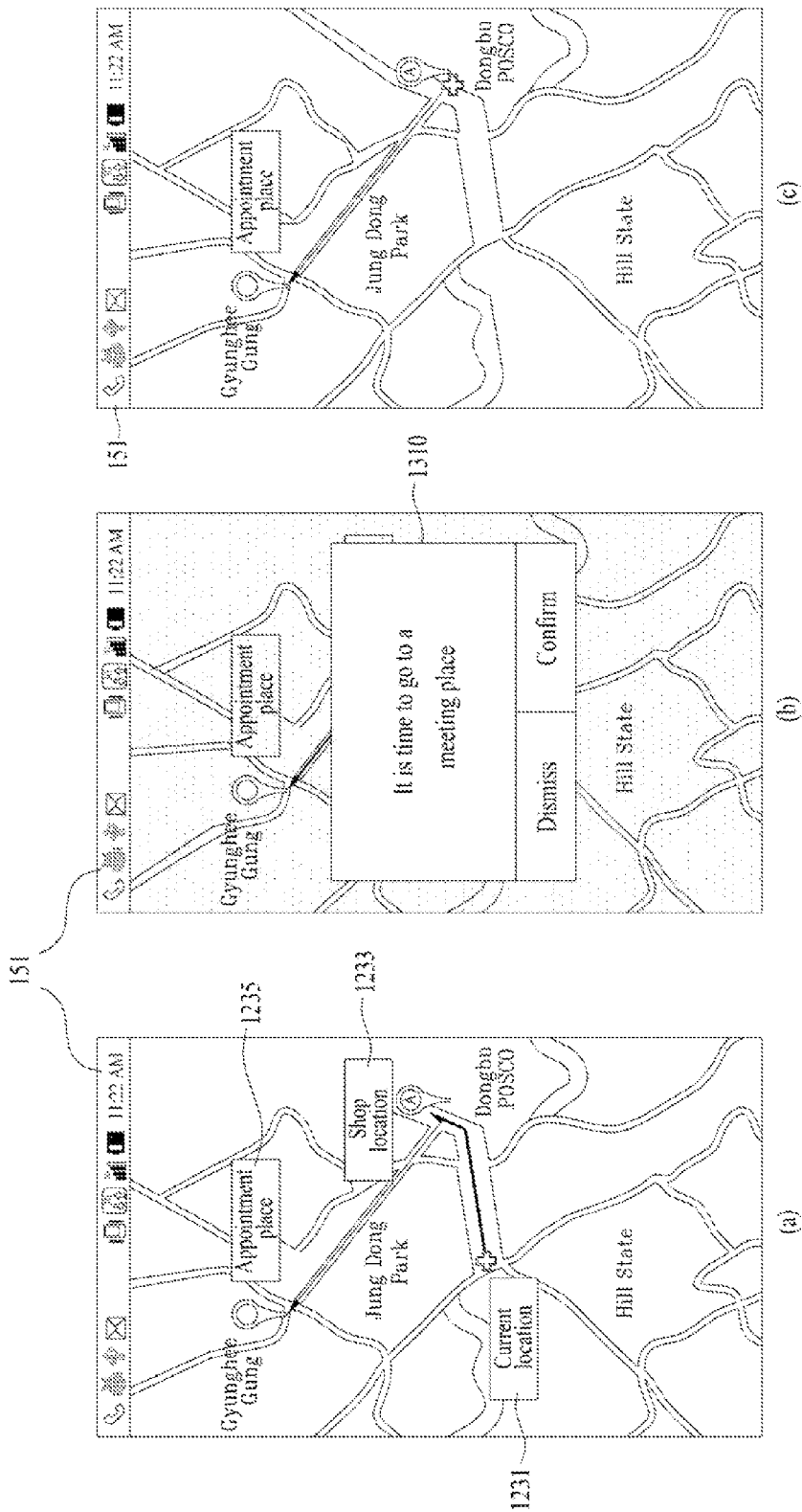
FIG. 13 is a diagram of display screen configuration for one example of a process for adding a guide point in response to a place when the guide point is already set in a mobile terminal according to one example embodiment of the present invention.

FIG. 13 is a diagram of display screen configuration for one example of a process for adding a guide point in response to a place when the guide point is already set in a mobile terminal according to one example embodiment of the present invention.

A situation shown in FIG. 13 is almost similar to that shown in FIG. 12. Yet, FIG. 13 assumes a case that a navigation function is activated as a point matching a keyword 'appointment place' is set as a first guide point. In this case, while a route guidance to the first guide point is being performed, if a current location is adjacent to a place matching a keyword item added via a text message, an indication information may be displayed. Hence, a current location 1231, a shop location 1233 and an appointment place location 1235 may be displayed on a map in map view mode and a route modified to pass through the shop location 1233 may be displayed [FIG. 13 (*a*)].

While a user stays at the shop, the controller 180 calculates a remaining distance to the appointment place and a time required for arriving at the appointment place. When the required time is added to a current time, if the added time approaches a closing time set in the keyword 'appointment place', the controller 180 may be able to display a warning text 1310 [FIG. 13 (*b*)]. Subsequently, the controller 180 may be able to control a remaining route to be displayed on the touchscreen 151 again [FIG. 13 (*c*)].

Meanwhile, while the navigation function is provided, if a current location approaches a selected guide point, the controller 180 may be able to control a source of a keyword item to be displayed on the touchscreen. In particular, the controller 180 may be able to remind a user of the reason why the user arrives at the guide point. Once the mobile terminal arrives at the guide point, the controller 180 may be able to control a keyword item matching the corresponding guide point to be automatically deleted from the keyword list. This is described with reference to FIG. 14 as follows.

Figure 14:
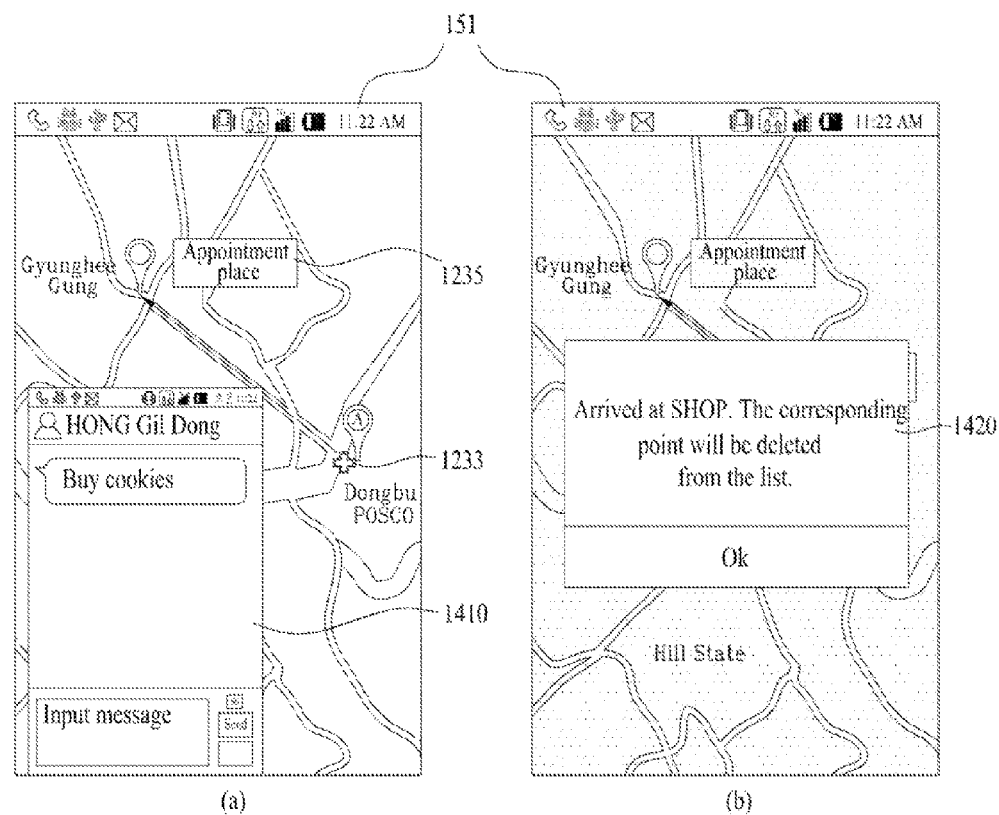
FIG. 14 is a diagram of display screen configuration to describe convenience features providable to a user when a navigation function is active in a mobile terminal according to one example embodiment of the present invention.

FIG. 14 is a diagram of display screen configuration to describe convenience features providable to a user when a navigation function is active in a mobile terminal according to one example embodiment of the present invention.

In FIG. 14, assume a case that the mobile terminal arrives at the shop location 1233 in the situation shown in FIG. 13 (*a*).

Referring to FIG. 14 (*a*), if the mobile terminal arrives at the shop location 1233, the controller 180 may be able to perform a reminder function in a manner of controlling a text message, from which an information on a keyword item matching the shop location 1233 is extracted, to be displayed as a popup window 1410 on the touchscreen.

If the mobile terminal arrives at the shop location 1233, the controller 180 may be able to control a popup window 1420 to be displayed to inform a user of the arrival. If the user selected the popup window 1420, the controller 180 may control the keyword item matching the corresponding guide point to be deleted from the keyword list.

The reminder function shown in FIG. 14 (a) and the keyword deleting function shown in FIG. 14 (B) may be performed in sequence. Alternatively, either the reminder function shown in FIG. 14 (a) or the keyword deleting function shown in FIG. 14 (B) may be performed.

According to the example embodiments mentioned in the foregoing description, a route guiding process after selection of at least one guide point is similar to a general navigation function. For clarity, the redundant description shall be omitted. According to the example embodiments mentioned in the foregoing description, the extraction of information related to a keyword item is described as mainly performed on the basis of text for example, by which the present invention may be non-limited. For instance, information related to a keyword item may be extractable from a multimedia content (e.g., image, voice recognition, video, etc.).

It will be apparent to those skilled in the art that various modifications and variations can be specified into other form(s) without departing from the spirit or scope of the inventions.

According to one example embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned example embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
an output unit configured to output information at least visually or audibly; and
a controller configured to:
receive information about a current location of the mobile terminal;
generate a keyword list including at least a first keyword item associated with at least a first place or a first time;
identify a second keyword item in information output or input during execution of an application;
add the identified second keyword item to the keyword list;
determine whether a distance between the first place and the current location is within a threshold distance or determine whether a time gap between the first time and present time is within a threshold time gap;
cause the output unit to output alerting information when the distance is determined to be within the threshold distance or when the time gap is determined to be within the threshold time gap;
generate route guidance from the current location to a first guide point in response to user input received after the alerting information is output, the user input confirming designation of the first place as the first guide point;
cause the output unit to display a map including the route guidance, wherein the map indicates a second place that is associated with the second keyword item included in the keyword list; and
cause the output unit to display an execution screen of the application at a portion of the map such that the displayed execution screen overlaps the displayed map when a distance between the second place and the current location is within the threshold distance, wherein the execution screen includes the information from which the second keyword item has been identified.

2. The mobile terminal of claim 1, wherein:
the controller is further configured to determine a moving speed of the mobile terminal; and
a value of the threshold distance varies according to the determined moving speed.

3. The mobile terminal of claim 1, wherein:
the controller is further configured to cause displaying of the keyword list; and
the first keyword item included in the displayed keyword list does not include an address of the first place or a name of the first place.

4. The mobile terminal of claim 1, wherein the application comprises a memo application, a messaging application, an email application, a web browser application, a phone application, a contact list application, a map application, a calendar application, an alarm application, or a multimedia application.

5. The mobile terminal of claim 1, wherein:
the controller is further configured to cause displaying of the identified second keyword item visually distinguishably over the rest of the information output or input during the execution of the application; and
the displayed second keyword item is selectable during the execution of the application such that the selected second keyword item is added to the keyword list.

6. The mobile terminal of claim 1, wherein the controller is further configured to:
cause displaying of a guide point list including at least the first guide point and a second guide point;
cause displaying of a map including a region located between two places corresponding to the first and second guide points in response to selection of the first and second guide points that are adjacent to each other; and
update the route guidance, adding a third guide point corresponding to a specific place to the guide point list, in response to selection of the specific place from the map including the region,
wherein the specific place is associated with at least one keyword item included in the keyword list.

7. The mobile terminal of claim 1, wherein the controller is further configured to delete the first keyword item from the keyword list when the mobile terminal arrives at the first guide point.

8. A method of controlling a mobile terminal, the method comprising:
- generating a keyword list including at least a first keyword item associated with at least a first place or a first time;
- identifying a second keyword item in information output or input during execution of an application;
- adding the identified second keyword item to the keyword list;
- obtaining information about a current location of the mobile terminal;
- determining whether a distance between the first place and the current location is within a threshold distance or determining whether a time gap between the first time and present time is within a threshold time gap;
- outputting alerting information when the distance is determined to be within the threshold distance or when the time gap is determined to be within the threshold time gap;
- generating route guidance from the current location to a first guide point in response to receiving user input confirming designation of the first place as the first guide point after the outputting of the alerting information;
- displaying a map including the route guidance, wherein the map indicates a second place that is associated with the second keyword item included in the keyword list; and
- displaying an execution screen of the application on a specific region of the map such that the displayed execution screen overlaps the displayed map when a distance between the second place and the current location is within the threshold distance, wherein the execution screen includes the information from which the second keyword item has been identified.

9. The method of claim 8, further comprising:
- determining a moving speed of the mobile terminal,
- wherein a value of the threshold distance varies according to the determined moving speed.

10. The method of claim 8, further comprising:
- displaying the keyword list,
- wherein the first keyword item included in the displayed keyword list does not include an address of the first place or a name of the first place.

11. The method of claim 8, wherein the application comprises a memo application, a messaging application, an email application, a web browser application, a phone application, a contact list application, a map application, a calendar application, an alarm application, or a multimedia application.

12. The method of claim 8, further comprising:
- displaying the identified second keyword item visually distinguishably over the rest of the information output or input during the execution of the application,
- wherein the displayed second keyword item is selectable during the execution of the application such that the selected second keyword item is added to the keyword list.

13. The method of claim 8, further comprising:
- displaying a guide point list including at least the first guide point and a second guide point;
- displaying a map including a region located between two places corresponding to the first and second guide points in response to selection of the first and second guide points adjacent to each other; and
- updating the route guidance, adding at least a third guide point corresponding to a specific place to the guide point list in response to selection of the specific place from the map including the region,
- wherein the specific place is associated with at least one keyword item included in the keyword list.

14. The method of claim 8, further comprising:
- deleting the first keyword item from the keyword list when the mobile terminal arrives at the first guide point.

15. The mobile terminal of claim 1, wherein:
- the output unit comprises a touchscreen;
- the alerting information is displayed on the touchscreen; and
- the user input is received via the touchscreen.

16. The mobile terminal of claim 1, wherein the controller is further configured to update the route guidance to add the second place as a second guide point.

17. The mobile terminal of claim 1, wherein the application comprises a messaging application and the information output or input during the execution of the messaging application corresponds to a message containing the second keyword item.

18. The mobile terminal of claim 1, wherein the execution screen is displayed as a popup window.

19. The mobile terminal of claim 1, wherein the output unit comprises a touchscreen and the controller is further configured to:
- cause the touchscreen to display a popup window informing arrival at the second place; and
- delete the second keyword item from the keyword list when the popup window is touched on the touchscreen.

\* \* \* \* \*